C. E. IVINS.
DUST PROOF CAP FOR TIRE VALVES.
APPLICATION FILED MAR. 3, 1914.
1,131,138.
Patented Mar. 9, 1915.
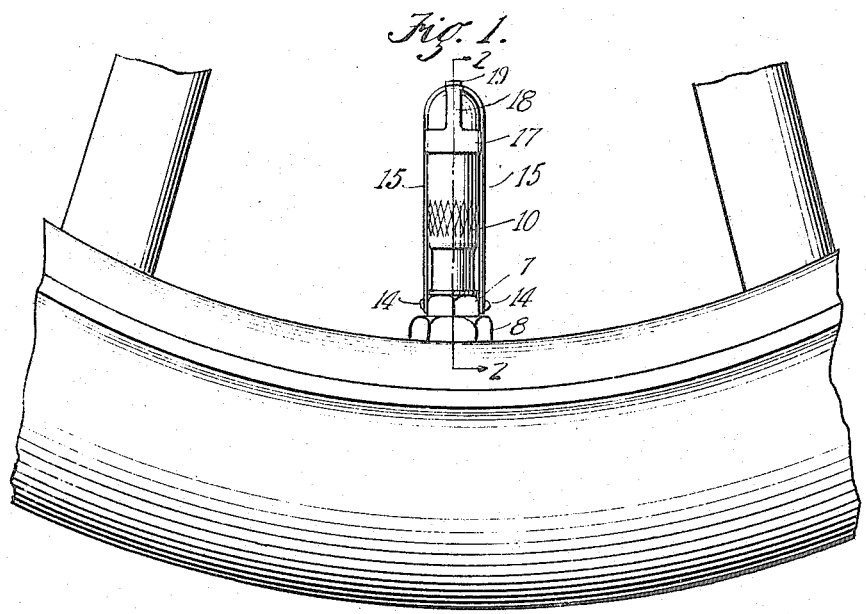
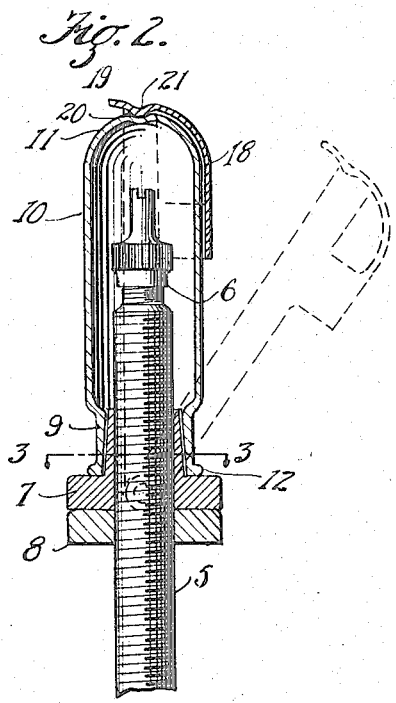
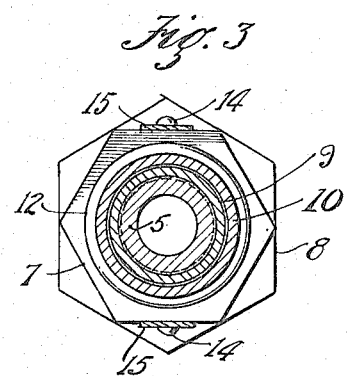
Witnesses:
James M. Abbett
Marguerite Bates
Inventor.
Clifford E. Ivins.
By Hazard & Strauss
Attys.

UNITED STATES PATENT OFFICE.

CLIFFORD E. IVINS, OF LOS ANGELES, CALIFORNIA.

DUST-PROOF CAP FOR TIRE-VALVES.

1,131,138.        Specification of Letters Patent.        Patented Mar. 9, 1915.

Application filed March 3, 1914. Serial No. 822,225.

*To all whom it may concern:*

Be it known that I, CLIFFORD E. IVINS, a citizen of the United States, residing at Los Angeles, in the county of Los Angeles, State of California, have invented new and useful Improvements in Dust-Proof Caps for Tire-Valves.

This invention relates to a dust proof cap for tire valves.

It is the purpose of this invention to provide a dust cap for the valves of pneumatic tires, and the principal object is to provide a simple mechanism for maintaining the cap in place on the valve when the same is not in use, and which can be readily operated to release the cap when it is desired to use the valve in inflating the tire.

A further object is to provide a device of the above character which can be quickly removed and applied, and which will be securely held in place against accidental removal.

A further object is to provide a dust cap on which can be readily applied to the valve casings of the conventional type of tire valves now generally in use.

The invention primarily resides in an internally threaded sleeve for screwing a valve on an externally threaded valve casing having a collar formed thereon, a removable dust cap adapted to inclose the upper end of the valve casing and to seat on the collar and sleeve, and a pivoted spring clamp for engaging the dust cap and retaining it in place.

The invention is illustrated in the accompanying drawings, in which:

Figure 1 is a view in side elevation illustrating the cap in place on a tire valve. Fig. 2 is a detail vertical section on the line 2—2 of Fig. 1, illustrating the manner of securing the cap in place and indicating the manner in which it is released, in dotted lines. Fig. 3 is an enlarged horizontal section on the line 3—3 of Fig. 2.

More specifically, 5 indicates the externally threaded cylindrical casing of the ordinary pneumatic tire valve having the usual cap 6 for closing the valve casing screwed on its upper end.

The present invention resides in an auxiliary means for incasing the upper portion of the valve casing by which dust will be effectively excluded therefrom. This means includes an internally threaded sleeve or nut 7, which is preferably hexagonal in outlines, as shown in Fig. 3, to facilitate its engagement with a wrench or similar tool, by which it may be screwed on or removed from the stem. A jam nut 8 is provided which nut is screwed on the stem 5 beneath the sleeve 7 against which the latter is jammed in the usual manner to prevent its working loose on the valve casing.

Formed on the upper face of the sleeve 7 is a collar 9 having a cylindrical outer face preferably slightly tapered from its juncture with the sleeve 7 toward its outer end. This collar being formed integral with the sleeve 7 and having its interior threaded in continuation of the threaded interior of the sleeve. The collar 9 forms a centralizing and lateral support for a removable dust cap 10 which is cylindrical in form and has its upper end closed by a dome-shaped end wall 11, and its lower end open and formed with a bead 12 adapted to seat on the sleeve 7; the inner surface of the lower portion of the cap being adapted to snugly fit the collar 9.

Pivoted at 14 on opposite sides of the sleeve 7 are parallel arms 15 which are adapted to extend upwardly on opposite sides of the dust cap 10 and are connected together at their upper ends by means of the curved portion 16 conforming to the dome-shaped end of the dust cap. The arms 15 are further connected together by means of a semi-circular strap 17 at a point adjacent their upper ends, by which they are braced in relation to each other to render them substantial; this strap conforming to the lateral periphery of the dust cap and serving as a stop for limiting the movement of the arms in one direction away from the dust cap. The strap 17 is connected to the portion 16 by means of a strap 18 which is continued beyond the outer edge of the portion 16 and slightly upturned to form a handle 19. Formed in the upper end 11 of the dust cap is a socket or depression 20 adapted to receive a boss 21 formed on the underside of the portion 16 of the arms 15 centrally thereof, which boss is adapted to normally spring into the socket 20 by reason of the resiliency of the portions 16 and 18 of the arms so as to clamp the dust cap 10 in position, as particularly shown in Fig. 2.

When it is desired to remove the dust cap, the arms 15 are rocked into the position indicated in dotted lines in Fig. 2 through the medium of the handle 19, or by pressing the arms rearwardly. This frees the cap and permits of its being readily removed to give access to the valve casing 5.

From the foregoing it will be seen that I have provided a dust cap which can be quickly removed and applied, and which will be effectively held in place by means of the clamping action of the arms 15.

What I claim is:

1. A dust cap for pneumatic tire valves, comprising a sleeve adapted to be threaded on the valve casing, a cap adapted to inclose the end portion of the valve casing and to seat on the sleeve, an arm pivoted on said sleeve and resilient clamping means on said arm for retaining the dust cap in position.

2. In a dust cap for pneumatic tire valves, a sleeve threaded to be screwed on the valve casing, a cap adapted to seat on said sleeve to inclose the outer end of the valve casing, a pair of connected arms pivoted to said sleeve, and resilient means for connecting said arms to the cap to retain the latter in position.

3. In a dust cap for pneumatic tire valves, a sleeve formed with a collar and threaded to receive the externally threaded end portion of the valve casing, a cylindrical cap having a dome-shaped end wall and adapted to encircle and engage the collar on the sleeve to inclose the upper portion of the valve stem, a pair of connected pivoted arms on said sleeve having a boss thereon adapted to engage a socket formed in the cap, whereby the latter is retained in position on the sleeve.

In witness that I claim the foregoing I have hereunto subscribed my name this 12th day of February, 1914.

CLIFFORD E. IVINS.

Witnesses:
 MARGUERITE BATES,
 MARIE BATTEY.